(12) United States Patent
Omarain

(10) Patent No.: US 6,457,767 B1
(45) Date of Patent: Oct. 1, 2002

(54) MOTOR VEHICLE HAVING A LOAD CARRYING POST

(75) Inventor: Hassan Omarain, Göteborg (SE)

(73) Assignee: Volvo Person Vagnar AB (SE)

( * ) Notice: Subject to any disclaimer, the term of this patent is extended or adjusted under 35 U.S.C. 154(b) by 0 days.

(21) Appl. No.: 09/716,976

(22) Filed: Nov. 20, 2000

Related U.S. Application Data

(63) Continuation of application No. PCT/SE99/00855, filed on May 20, 1999.

(30) Foreign Application Priority Data

May 25, 1998 (SE) .............................. 9801828

(51) Int. Cl.⁷ .................................................. B60H 1/00
(52) U.S. Cl. ...................................................... 296/208
(58) Field of Search ........................... 296/208; 454/162, 454/164, 358

(56) References Cited

U.S. PATENT DOCUMENTS 2,696,774 A * 12/1954 Bayley
3,715,966 A * 2/1973 Miettinen
4,711,159 A 12/1987 Armbruster

FOREIGN PATENT DOCUMENTS

| DE | 2130571 A | 12/1972 |
| DE | 2750671 A1 | 5/1979 |
| DE | 4123949 A1 | 1/1993 |
| EP | 0189074 A2 | 7/1986 |

* cited by examiner

Primary Examiner—D. Glenn Dayoan
Assistant Examiner—Scott Carpenter
(74) Attorney, Agent, or Firm—Howrey, Simon, Arnold & White, LLP.

(57) ABSTRACT

A motor vehicle having a load-carrying post intended to support the roof structure of the motor vehicle. The motor vehicle (17) has a passenger compartment and an air-conditioning system intended to supply ventilation air to said passenger compartment via air ducts. The load-carrying post (1,31) accommodates at least one air duct (4,24), to which the air-conditioning system is connected, and includes at least one air-vent connection (7,27) which is arranged as to allow the ventilation air (6,26) to be directed in a first direction (9,29) essentially counter to the intended main direction of travel of said motor vehicle (17). The invention finds its main application when the aim is to achieve more flexible regulation of the ventilation air supplied in the region around what is known as the B-post, but also in order to avoid small children secured in child car-seats in the front or rear passenger space being exposed to unnecessary drafts.

11 Claims, 4 Drawing Sheets

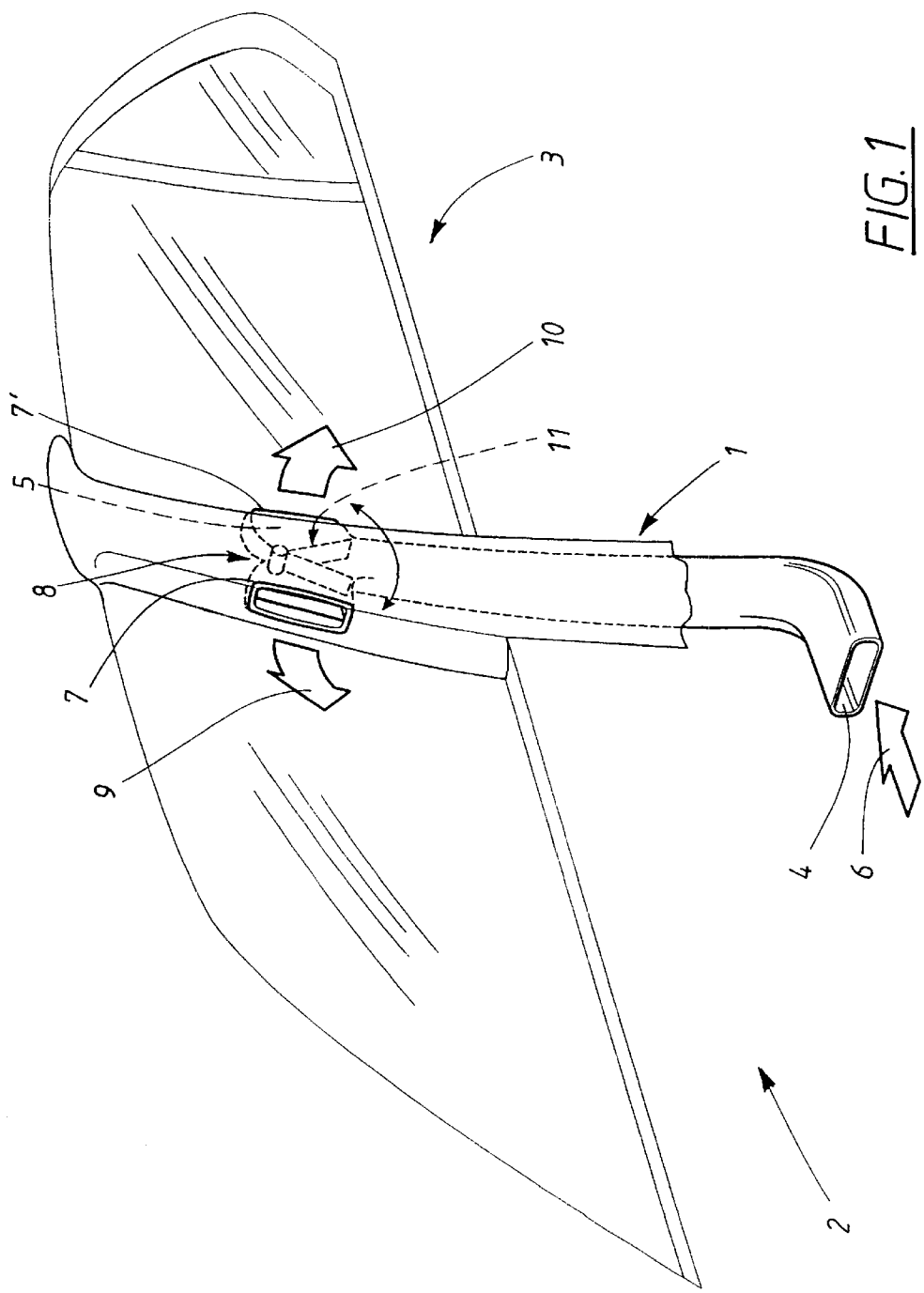

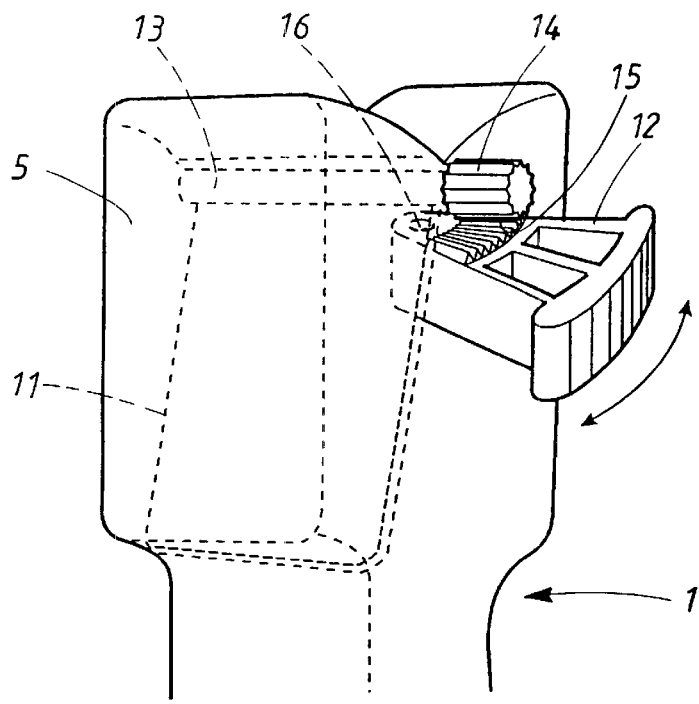
FIG. 2A
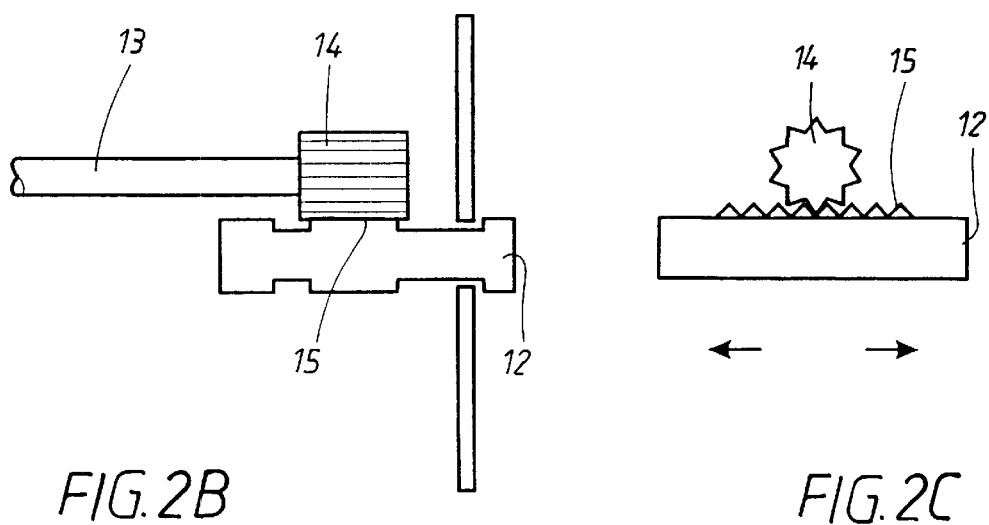
FIG. 2B
FIG. 2C

MOTOR VEHICLE HAVING A LOAD CARRYING POST

RELATED PATENT APPLICATIONS

This is a continuation patent application of International Application Number PCT/SE99/00855 filed May 20, 1999 entitled MOTOR VEHICLE HAVING A LOAD CARRYING POST and which designates the United States.

TECHNICAL FIELD

The present invention relates to a motor vehicle comprising a load-carrying post which is intended to support the roof structure of the motor vehicle. The motor vehicle comprises a passenger compartment and an air-conditioning system intended to supply ventilation air to the passenger compartment via air ducts. The load-carrying post of the motor vehicle, according to the invention, accommodates at least one air duct, to which the air-conditioning system is connected, and at least one air-vent connection which allows the ventilation air to be directed in a first direction essentially counter to the intended main direction of travel of the motor vehicle.

The present invention finds its main application when the aim is to achieve more flexible regulation of the ventilation air supplied to the passenger compartment from the air-conditioning system of the motor vehicle in the region around what is known as the B-post. The invention can also be applied when the aim is to avoid small children secured in child car-seats in the front or rear passenger space being exposed to unnecessary drafts from supplied ventilation air.

BACKGROUND OF THE INVENTION

A number of different ventilation systems and air-conditioning systems for use in passenger compartments of motor vehicles are known.

The increasingly greater requirement for comfort has led to many modem motor vehicles being provided with air-conditioning systems of the type which is capable of automatically regulating the temperature in the passenger compartment so that it is constantly maintained at a desired temperature level.

Combinations of automatic and manual regulation of the supply of ventilation air and fresh air are also known. Many motor vehicles of the passenger type are thus, today, provided with openable and closable openings for ventilation air which are combined with the dashboard of the motor vehicle. The flow of ventilation air can in general also be guided in the desired direction by means of a rotatable vent, throttles and the like.

Known ventilation and air-conditioning systems for motor vehicles can, however, be considered to have certain shortcomings. With regard to the supply of ventilation air which is intended to keep the side windows of the motor vehicle free of fog and the like, this is in general effected by fixed vents which are arranged in combination with the dashboard or in the doors of the vehicle at the front or lower edges of the side windows.

Such a supply of ventilation air is in general controlled by the central air-conditioning system of the motor vehicle and is typically directed backwards in the passenger compartment of the vehicle.

In the event that it is desired to put a small child in a child car-seat in either the front or rear passenger seat of the motor vehicle, it is unsuitable, in particular as far as babies are concerned, for the child to be exposed to drafts. In motor vehicles configured with conventional air-conditioning systems, it is often impossible to close or throttle the supply of ventilation air in the direction of, for example, the rear seat. This can result in a child who is secured in a forward-facing child car-seat in a passenger space of the rear seat being exposed to undesirable drafts.

Even when a child is secured in a child car-seat in the front seat, it can be an advantage to be able to guide the supply of ventilation air away from the child in various ways.

Furthermore, it can also be desirable under other circumstances to be able to guide or concentrate the ventilation air in the direction of the desired side window. An example of such circumstances is when a person with wet clothes is sitting in a front or rear passenger space. Another example is when it is desirable or necessary to supply extra ventilation air in order to avoid the formation of fog, mist and the like on the side windows. Conventional air-conditioning systems in motor vehicles do not generally offer this possibility.

In view of the above described deficiencies associated with conventionally designed load carrying posts, the present invention has been developed. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventionally designed motor vehicles having load carrying posts and incorporates several additional beneficial features.

A first object of the present invention is therefore to make it possible for the supply of ventilation air to be guided or concentrated in the direction of a target side window of the motor vehicle, and also in a direction essentially counter to the intended main direction of travel of the motor vehicle. This object is achieved, as further described hereinbelow, by a motor vehicle having a load-carrying post intended to support the roof structure of the vehicle. Such a motor vehicle typically has a passenger compartment and an air-conditioning system which is intended to supply ventilation air to the passenger compartment via air ducts. According to the invention, the load-carrying post accommodates at least one air duct to which the air-conditioning system is connected. The load-carrying post also includes at least one air-vent connection which is arranged so as to allow the ventilation air to be directed in a first direction essentially counter to the intended main direction of travel of the motor vehicle.

A second object of the present invention is to eliminate the problem of small children or other passengers in the front or rear passenger space from being exposed to unnecessary drafts. This object is achieved by virtue of the fact that the passenger compartment of the motor vehicle has at least one front passenger space and one rear passenger space arranged one behind the other in the longitudinal direction of the motor vehicle. The load-carrying post constitutes a part of the body of the motor vehicle and is located in a position which, seen from the side of the motor vehicle, lies between the front passenger space and the rear passenger space. Accordingly, the load-carrying post accommodates the air duct and also an air-distribution chamber. In this connection, the air duct is arranged for supplying the ventilation air from the air-conditioning system, while the air distribution chamber is provided with at least one of the air-vent connections and an air-direction selector. The air-direction selector is in this case arranged so as to direct the ventilation air in essentially the first direction towards the front passenger space, or in a second direction predominantly towards the rear passenger space. The air-direction selector is arranged so as to be capable of being operated by means of an operating member in the passenger compartment.

BRIEF DESCRIPTION OF THE DRAWINGS

The invention will now be described in greater detail in the following way, by example only, and with reference to the attached drawings, in which:

FIG. 1 shows a perspective view, in partial cut-away, of a portion of the right side of a passenger compartment of a motor vehicle, including a load-carrying post configured according to a preferred embodiment of the invention.

FIG. 2A shows diagrammatically and partly in phantom (dashed lines) detailed perspective view of the air-distribution chamber, air duct, throttle member and operating member of the load-carrying post that is shown in FIG. 1.

FIG. 2B shows a detailed view, seen in the longitudinal direction of the motor vehicle, of the operating member of FIG. 2A.

FIG. 2C shows a detailed view, seen in the transverse direction of the motor vehicle, of the operating member of FIG. 2B.

DETAILED DESCRIPTION OF THE INVENTION

Figure 3:
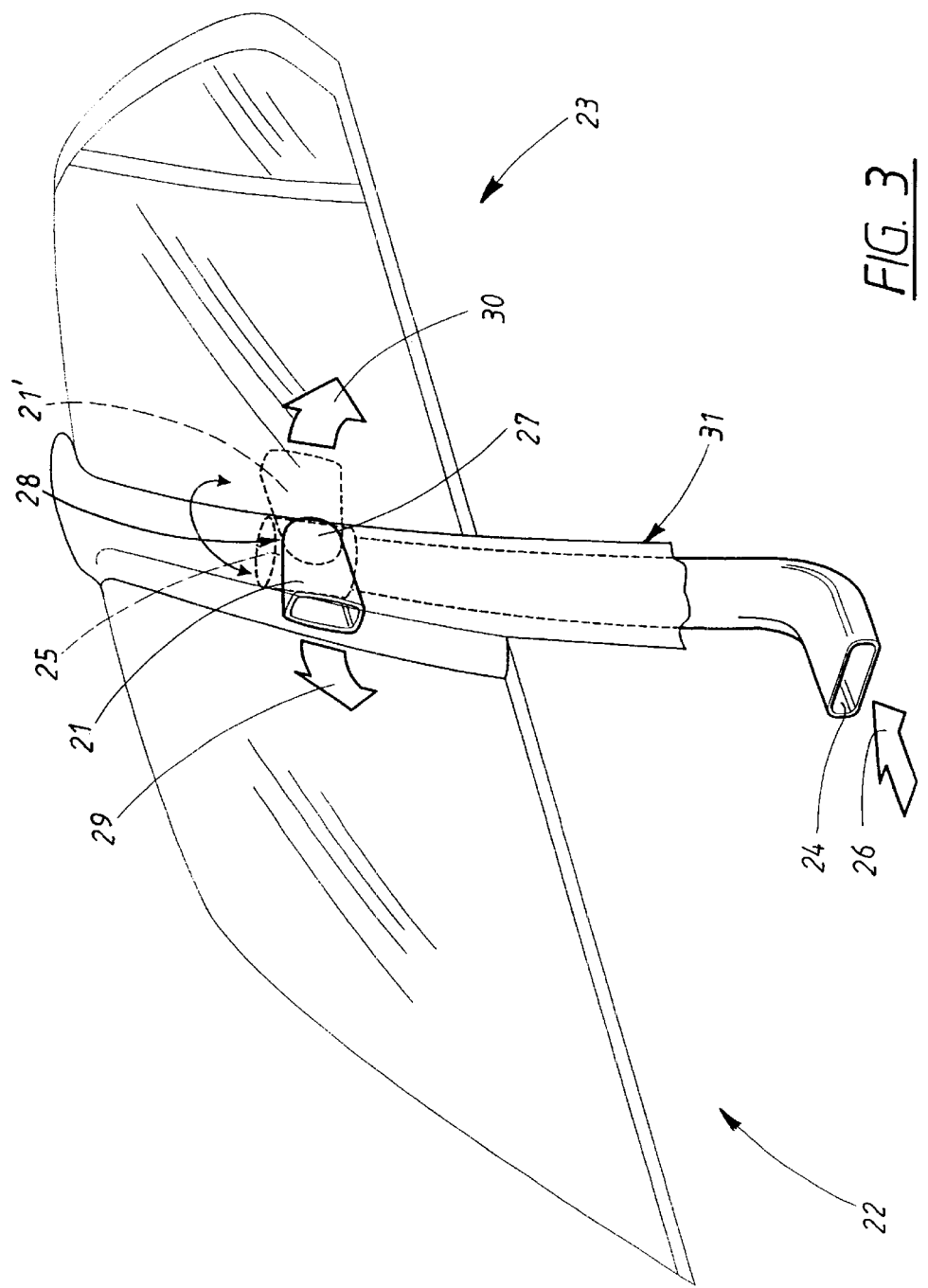
FIG. 3 shows a similar view to that in FIG. 1 but with a load-carrying post configured according to an alternative embodiment of the invention.

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention. It should be appreciated that a number of components in the portion of the passenger compartment shown in the appended figures have been deliberately omitted so as to illustrate the invention more clearly. Thus, for example, no attachment for a safety belt is shown. Such an attachment is still, of course, arranged in a suitable place on the load-carrying post in all motor vehicles according to the present invention.

A preferred embodiment of the invention will be described immediately below with reference to the appended FIGS. 1–2C and 4. A motor vehicle 17 according to the invention comprises a load-carrying post 1 which is intended to support the roof structure of the motor vehicle 17. In the preferred embodiment, this is effected in the manner shown in the appended FIG. 4. In this connection, the load-carrying post 1 extends essentially vertically in relation to the plane formed by a floor panel (not shown, but well known) forming part of the motor vehicle 17.

The motor vehicle 17 also comprises a passenger compartment and an air-conditioning system of known type, but not shown in the figures, which is intended to supply ventilation air to the passenger compartment via air ducts.

In the preferred embodiment, the load-carrying post 1 accommodates an air duct 4 (See FIG. 1) to which the air-conditioning system of the vehicle is connected. It is also possible, however, to envision embodiments of the invention in which the load-carrying post 1 accommodates more than one air duct.

According to this embodiment of the invention, the load-carrying post 1 also includes at least one air-vent connection 7 which is arranged so as to allow the ventilation air to be directed in a first direction 9 essentially counter to the intended main direction of travel of the motor vehicle. In the preferred embodiment, the load-carrying post comprises two air-vent connections 7,7', but embodiments of the invention are also contemplated in which the number of air-vent connections is only one, or possibly more than two.

Figure 4:
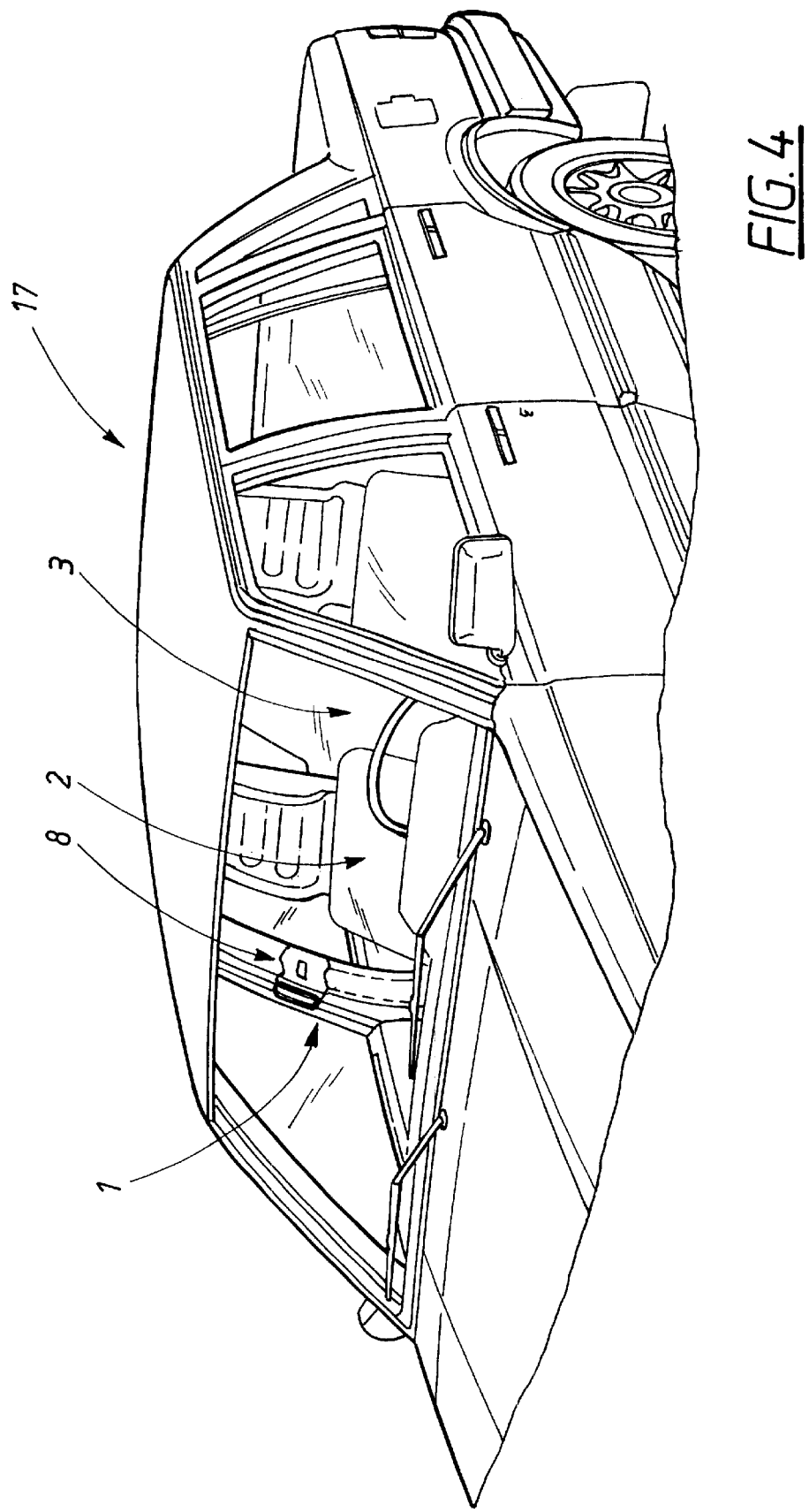
FIG. 4 shows a perspective view of a portion of a motor vehicle that incorporates the load-carrying post that is illustrated in FIGS. 1–2C.

In the preferred embodiment of the invention, the load-carrying post 1 is located behind the front side window of the motor vehicle, as can be seen in FIG. 4.

In the preferred embodiment, the load-carrying post 1 comprise a tube-shaped beam element which forms the air duct 4. It is also possible, however, to envision embodiments of the invention in which the load-carrying post includes separate elements which, in a suitable manner, form air ducts inside a separate, load-carrying structure.

In the preferred embodiment, as indicated above, the air duct 4 is formed by the tube-shaped beam element which moreover imparts to the load-carrying post 1 its requisite load-carrying capacity. The tube-shaped beam element is provided in its interior with a specially designed transverse wall which terminates the air duct 4, so that an air-distribution chamber 5 is formed at the end of the air duct 4. In connection with the air-distribution chamber 5, the tube-shaped beam element is provided with first and second openings in the form of the air-vent connections 7,7', which allow the passage of ventilation air 6 supplied via the air duct 4 to the passenger compartment of the motor vehicle thereby making it possible for the ventilation air 6 to be supplied in the desired direction 9,10. In this embodiment, the ventilation air 6 is supplied to the passenger compartment via air vents which are connected to the two air-vent connections 7,7'. The air vents are in this respect provided with movable deflectors so as to allow fine adjustment of the direction of the ventilation air supplied. The air vents can advantageously also be provided with flaps or the like to make it possible to shut off the air flow as desired.

According to this preferred embodiment, the passenger compartment has at least one front passenger space 2 and one rear passenger space 3 arranged one behind the other in the longitudinal direction of the motor vehicle. It is also possible, however, to envision embodiments with only a front or a rear passenger space, or with a number of front and/or rear passenger spaces.

In the preferred embodiment, the load-carrying post 1 constitutes a part of the body of the motor vehicle 17 in a position which, seen from the side of said motor vehicle 17, lies between the front passenger space 2 and the rear passenger space 3. A load-carrying post in such a position in the body of a motor vehicle is generally known as a B-post. The post 1 accommodates the air duct 4 and an air-distribution chamber 5. In this connection, the air duct 4 is arranged for supplying the ventilation air 6 from the air-conditioning system to which the air duct 4 is connected in a suitable manner (not shown in the figures).

The air-distribution chamber 5 is, as indicated above, provided with two air-vent connections 7,7' which are provided with front and rear air vents. The air-distribution chamber 5 is also provided with an air-direction selector 8 which is arranged to direct the ventilation air 6 in essentially a first direction 9 substantially towards the front passenger space 2 or in a second direction 10 substantially towards the rear passenger space 3. The air-direction selector 8 is arranged so as to be capable of being operated by means of an operating member 12 that is not shown in FIG. 1, but is shown in FIGS. 2A–2C, and is indicated in FIG. 4 inside the passenger compartment.

In the preferred embodiment, the air-distribution chamber 5 thus comprises two air-vent connections 7,7' with front and rear air vents, but, as indicated above, embodiments are also possible with only one air-vent connection or with more than two air-vent connections. The front and rear air vents which are connected to the air-vent connections 7,7' may have the appearance shown in FIG. 1 with reference to air-vent connection 7, but can have any suitable design.

In the preferred embodiment, the front air vent is intended to be directed essentially in the first direction; that is to say, in the direction along the side window towards the front passenger space 2. The rear air vent (not visible in FIG. 1) is intended to be directed essentially in the second direction 10; that is to say, in the direction along the side window towards the rear passenger space 3. It is of course also possible to envision embodiments of the invention in which the air vent or vents constitute(s) an integrated part of the air-distribution chamber, or in which the air vents are capable of directing the ventilation air at an angle which is not parallel to the side windows of the motor vehicle.

In the preferred embodiment, the air-direction selector 8 comprises a throttle member 11 arranged inside the air distribution chamber 5. The design of the throttle member 11 and the design of the air-distribution chamber 5 are adapted to one another so that the throttle member 11 functions as a valve flap suspended in the air-distribution chamber 5 between the two air-vent connections 7,7'.

By using the operating member 12 (see FIGS. 2A–2C) to change the position of the throttle member 11, the ventilation air 6 can be guided to the front air vent or to the rear air vent, or to both the front and rear air vents simultaneously.

In connection with the description above, it should be appreciated that many different alternative embodiments of the air duct 4 and, when appropriate, the air-distribution chamber 5 and the air-direction selector 8 are possible within the scope of the invention, as long as they make possible the desired control of the direction of the ventilation air in the region around the B-post of the motor vehicle, or at least make it possible for the ventilation air to be directed in the first direction 9.

In the preferred embodiment of the invention, the throttle member 11 is fixed to a first spindle 13 provided with first teeth 14. In this connection, the operating member 12 is provided with second teeth 15 and can be rotated about a second spindle 16. The first teeth 14 and the second teeth 15 are arranged so as to engage in one another when the position of the throttle member 11 is changed by means of the operating member 12, in the manner that can be seen in FIGS. 2A–2C. Many other suitable designs of the operating member 14 are of course possible and considered to be within the scope of the invention.

An alternative embodiment of a motor vehicle 17, but one which includes construction according to this invention, comprising as load-carrying post 31 which will be described with reference to FIG. 3. In this embodiment, the air-direction selector 28 is arranged to also function as an operating member that takes the form of a rotatable air vent 21,21'.

The rotatable air vent 21,21' is connected to a (single) air-vent connection 27 of the air-distribution chamber 25, so that the rotatable air vent 21,21', depending on its position, guides the ventilation air 26 in a first direction 29 or in a second direction 30. In the alternative embodiment, it is also possible for the air vent 21,21', depending on its position, to guide the ventilation air 26 in a direction between the first direction 29 and the second direction 30, for example straight or obliquely upwards or downwards.

The load-carrying post 1,31 of the motor vehicle according to the present invention also comprises a load-carrying material structure because the load-carrying post 1,31 must be capable of supporting a roof structure of the motor vehicle, and moreover form a part of the protective "cage" which surrounds the passenger compartment. In the load-carrying post 1,31 of FIGS. 1–4, the load-carrying material structure is included in the material layers which surround the air duct 4,24 and the air-distribution chamber 5,25.

In an advantageous embodiment of the invention, the above-mentioned load-carrying structure surrounds at least partly the air-distribution chamber 5,25 and the air duct 4,24. In this way, a strong, but light construction of the load-carrying post 1,31 can be obtained because the load-carrying material structure is interrupted only for air-vent connections and openings for connection of an operating member to any air-direction selector arranged inside the air distribution chamber. As indicated previously, at least one embodiment of a motor vehicle according to the teachings of the present invention in which the load-carrying material structure is incorporated, the air-distribution chamber and the air duct advantageously consist of a single component.

In advantageous embodiments of the motor vehicle according to the invention, the load-carrying material structure and/or the air-distribution chamber 5,25 and the air duct 4,24 can be made of material comprising steel alloys or aluminum alloys; for example, in the form of conventional sheet metal for motor cars which has been bent or otherwise shaped so as to provide the desired form.

In another advantageous embodiment of the motor vehicle according to the invention, the load-carrying material structure and/or the air distribution chamber 5,25 and the air duct 4,24 are made of one or more composite material(s) shaped in a previously known manner for manufacture of load-carrying motor-vehicle components.

In a particularly advantageous embodiment of the invention, the air distribution chamber 5,25 and/or the air duct 4,24 comprise(s) one or more blow-molded hollow bodies made of thermoplastic polymer material. Such blow-molded hollow bodies can be made from a suitable unreinforced or reinforced thermoplastic material and incorporated into a load-carrying material structure in order to form a load-carrying post for a motor vehicle.

In other advantageous embodiments of the motor vehicle according to the invention, the load-carrying post consists entirely of one or more blow-molded hollow bodies made of thermoplastic material, with reinforced layers which provide the necessary load-carrying material structure.

Furthermore, embodiments of the invention can be envisioned in which the load-carrying post of the motor vehicle is manufactured in another suitable manner according to the known practices for the production of components made of composite materials which comprise polymers, fibers, filaments, textile materials, non-woven materials, plastics and/or metals.

The present invention is in no way to be considered as being limited to the description given here in connection with the various embodiments or to the illustrations in the appended figures, but the scope of the invention is defined by the claims below. Embodiments of the load-carrying post of the motor vehicle according to the invention can thus also be envisioned, in which rotatable air vents, according to the alternative embodiment described above, are connected to a number of different air-vent connections of an air-distribution chamber provided with an enclosed air-direction selector with an operating member configured according to the description given above in connection with the preferred embodiment.

Furthermore, it is of course also possible to use a load-carrying post according to any of the types described above on the driver's side of the motor vehicle, or to use a number of load-carrying posts in a motor vehicle which have more than two rows of passenger seats.

What is claimed and desired to be secured by Letters Patent is as follows:

1. A motor vehicle having an air distribution arrangement comprising:
   a load-carrying post arranged to support the roof structure of said motor vehicle,
   said motor vehicle having a passenger compartment and an air-conditioning system for supplying ventilation air to said passenger compartment via air ducts; and
   said load-carrying post configured to accommodate at least one air duct to which the air-conditioning system is fluidly connected,
   said load-carrying post further comprising at least one air-vent connection arranged to allow ventilation air to be directed in a first direction substantially coincident with the intended main direction of travel of said motor vehicle and a second direction which is separated from the first direction;
   said passenger compartment further comprising at least a front passenger space and a rear passenger space located behind said front passenger space in a longitudinal direction of travel of said motor vehicle;
   wherein said load-carrying post comprises a part of the body of said motor vehicle in a position which, seen from the side of said motor vehicle, lies between said front passenger space and said rear passenger space,
   said load-carrying post accommodating therein said air duct and an air distribution chamber, said air duct being arranged for supplying said ventilation air from said air-condition system, and said air-distribution chamber being provided with at least one of said air-vent connections and an air direction selector,
   said air-direction selector being arranged so as to direct said ventilation air in substantially said first direction towards said front passenger space, or in substantially said second direction towards said rear passenger space, and
   said air-direction selector being arranged so as to be capable of being operated by an operating member located in said passenger compartment.

2. An air distribution arrangement as recited in claim 1, wherein said load-carrying post is located behind a front side window of the motor vehicle.

3. An air distribution arrangement as recited in claim 1, wherein said load-carrying post comprises a tube-shaped beam element within which said air duct is formed.

4. An air distribution arrangement as recited in claim 1, said air-distribution chamber further comprising at least two air-vent connections for connection to front and rear air vents, said front air vent able to be directed substantially in the second direction; and
   said air-direction selector further comprising a throttle member arranged inside the air-distribution chamber so that positioning of said air-direction selector controls the direction of said ventilation air to said front air vent, said rear air vent, or to both said vents,
   said operating member being arranged to change said position of the throttle.

5. An air distribution arrangement as recited in claim 4, further comprising:
   said throttle member being fixed to a first spindle provided with first teeth and said operating member being provided with second teeth rotatable about a second spindle; and
   said first teeth and said second teeth being arranged to engage in one another when the position of the throttle member is changed by actuation of the operating member.

6. An air distribution arrangement as recited in claim 1, wherein said load-carrying post further comprises a load-carrying material structure surrounding at least partly an air-distribution chamber and said air duct, and said load-carrying material structure being made of material comprising steel alloys or aluminum alloys.

7. An air distribution arrangement as recited in claim 1, wherein said load-carrying post further comprises a load-carrying material structure surrounding at least partly an air-distribution chamber and said air duct, and said air-distribution chamber and said air duct being made of material comprising steel alloys or aluminum alloys.

8. An air distribution arrangement as recited in claim 1, wherein said load-carrying post further comprises a load-carrying material structure surrounding at least partly an air-distribution chamber and said air duct, and said load-carrying material structure being made of material comprising at least one composite material.

9. An air distribution arrangement as recited in claim 1, wherein said load-carrying post further comprises a load-carrying material structure surrounding at least partly an air-distribution chamber and said air duct, and said air-distribution chamber and said air duct being made of material comprising at least one composite material.

10. An air distribution arrangement as recited in claim 1, further comprising an air-distribution chamber having at least one blow-molded hollow body comprising thermoplastic polymer material.

11. An air distribution arrangement as recited in claim 1, wherein said air duct comprises at least one blow-molded hollow body made of thermoplastic polymer material.

* * * * *